(12) United States Patent
Yetukuri

(10) Patent No.: US 7,451,262 B2
(45) Date of Patent: Nov. 11, 2008

(54) REMOVABLE MEMORY STORAGE DEVICE HAVING A DISPLAY

(76) Inventor: Nagarjun V Yetukuri, 194 Sandalwood Dr., Rochester Hills, MI (US) 48307

( * ) Notice: Subject to any disclaimer, the term of this patent is extended or adjusted under 35 U.S.C. 154(b) by 181 days.

(21) Appl. No.: 11/293,601

(22) Filed: Dec. 2, 2005

(65) Prior Publication Data

US 2007/0130413 A1 Jun. 7, 2007

(51) Int. Cl.
*G06F 12/00* (2006.01)
(52) U.S. Cl. ........................................ 711/103
(58) Field of Classification Search .................. None
See application file for complete search history.

(56) References Cited

U.S. PATENT DOCUMENTS

| | | | |
|---|---|---|---|
| 5,491,785 A | 2/1996 | Robson et al. | |
| 6,345,000 B1 | 2/2002 | Wong et al. | |
| 6,373,747 B1 | 4/2002 | Harari et al. | |
| 6,476,817 B1 | 11/2002 | Harper et al. | |
| 6,776,348 B2 | 8/2004 | Liu et al. | |
| 6,919,877 B2 * | 7/2005 | Hong | 345/156 |
| 2003/0092468 A1 * | 5/2003 | North | 455/556 |
| 2003/0128193 A1 * | 7/2003 | Huang et al. | 345/173 |
| 2003/0178485 A1 * | 9/2003 | Lee | 235/435 |
| 2003/0227451 A1 | 12/2003 | Chang | |
| 2004/0135813 A1 * | 7/2004 | Kanai | 345/781 |
| 2006/0005131 A1 * | 1/2006 | Tao | 715/702 |
| 2006/0095849 A1 * | 5/2006 | Vertaschitsch et al. | 715/717 |
| 2006/0105722 A1 * | 5/2006 | Kumar | 455/90.3 |
| 2006/0148569 A1 * | 7/2006 | Beck | 463/43 |
| 2006/0160567 A1 * | 7/2006 | Parivash | 455/556.2 |
| 2006/0284987 A1 * | 12/2006 | Wolf, II | 348/220.1 |
| 2007/0083394 A1 * | 4/2007 | Reddy | 705/3 |
| 2007/0112981 A1 * | 5/2007 | Hernandez | 710/62 |
| 2007/0183209 A1 * | 8/2007 | Ni et al. | 365/185.22 |

* cited by examiner

*Primary Examiner*—Hiep T Nguyen
(74) *Attorney, Agent, or Firm*—Harness, Dickey & Pierce, P.L.C.

(57) ABSTRACT

A flash drive is disclosed. The flash drive can be removably connected to a computing device for storing files transferred from the computing device. The flash drive includes at least one flash memory chip operable to store files transferred from the computing device. The flash drive also includes a display operable to display information related to files stored on the flash memory chip. The flash drive also includes an input device that is operable for providing input for managing files stored on the flash drive.

21 Claims, 2 Drawing Sheets

REMOVABLE MEMORY STORAGE DEVICE HAVING A DISPLAY

FIELD

The present disclosure relates to a removable memory storage device and, more particularly, to a removable memory storage device having a display.

BACKGROUND

The statements in the following section merely provide background information related to the present disclosure and may not constitute prior art.

Computers have become an integral part of every day life. Information is communicated, processed, and stored using computers. The computer industry has responded with innovations to meet increasing computing demands of its customers. In particular, computers continue to improve by providing users with more capability, faster processing speeds, and more memory storage capacity. These improvements have led to increasing demands for external data storage devices that allow a user to easily transport relatively large amounts of computer data.

Thus, flash drives and other removable memory storage devices have been developed that can connect to a computer and receive and store computer files quickly and easily. These devices are then removed from the computer to transport the computer files. These devices are often relatively small for convenience. Also, the removable external memory devices are available in a broad range of memory storage capacities.

Although these external memory devices have been widely used, it can be difficult to identify what is stored on the device. A user can find out what is stored in the memory on these removable memory storage devices by connecting the device to a computer and listing the files stored in memory on the computer's screen. However, without the computer, a user cannot easily identify the stored contents of the removable memory storage device. Other devices display limited information about the stored contents. For instance, U.S. patent application Ser. No. 10/163,551 to Change discloses a portable flash drive that displays the current memory space available on the device. However, in order to view and manage the files stored on the Change flash drive, the user must connect the drive to a computer. As such, the Change flash drive is relatively limited in its capabilities.

Accordingly, there remains a need for an external memory storage device that allows a user to more easily and conveniently view and manage contents stored thereon.

SUMMARY

A flash drive is disclosed. The flash drive can be removably connected to a computing device for storing files transferred from the computing device. The flash drive includes at least one flash memory chip operable to store files transferred from the computing device. The flash drive also includes a display operable to display information related to files stored on the flash memory chip. The flash drive also includes an input device that is operable for providing input for managing files stored on the flash drive.

Also disclosed is an external memory storage device that can be removably connected to a computing device for storing files transferred from the computing device. The memory storage device includes a connector that allows files to be transferred between the computing device and the memory storage device. The memory storage device further includes a solid-state memory component operable to store files and file properties transferred to the memory component from the computing device. The memory storage device also includes a display operable to display file names stored on the memory component and operable for providing input for managing files stored on the memory component. Also, the memory storage device includes a touch sensitive device for providing input for managing files stored on the memory component.

Additionally disclosed is a flash drive that can be connected to a computing device for storing files moved from the computing device. The flash drive includes a housing, a circuit board encapsulated within the housing, and a connector operable to allow files to be transferred between the computing device and the flash drive. The flash drive also includes at least one flash memory chip operable to store files and file names moved from the computing device. The flash drive also includes an LCD touch screen display operable to display file names on the flash memory chip. The touch screen display is also operable for providing input for managing the files stored on the flash memory chip. Furthermore, the flash drive includes an operating system that allows a user to manage files stored on the flash memory chip. The operating system allows a user to view files, view file properties, delete files, copy files, paste files, rename files, create new files, or a combination of these functions.

Further areas of applicability will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The drawings included herein are for illustration purposes only and are not intended to limit the scope of the disclosure in any way.

DETAILED DESCRIPTION

The following description of the preferred embodiment(s) is merely exemplary in nature and is in no way intended to limit the scope of the disclosure, application, or uses.

Figure 1:
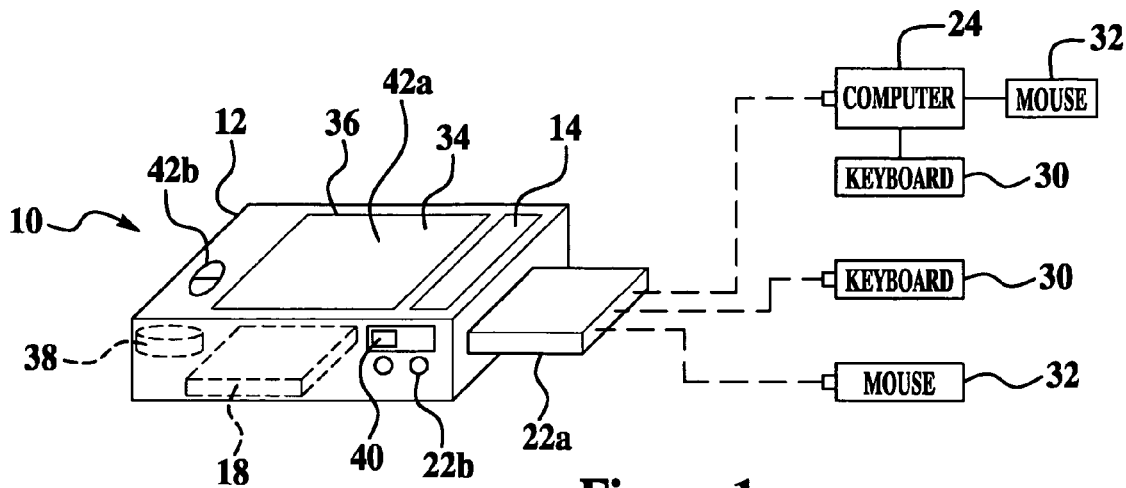
FIG. 1 is a schematic view of one embodiment of an external memory storage device.
Figure 2A:
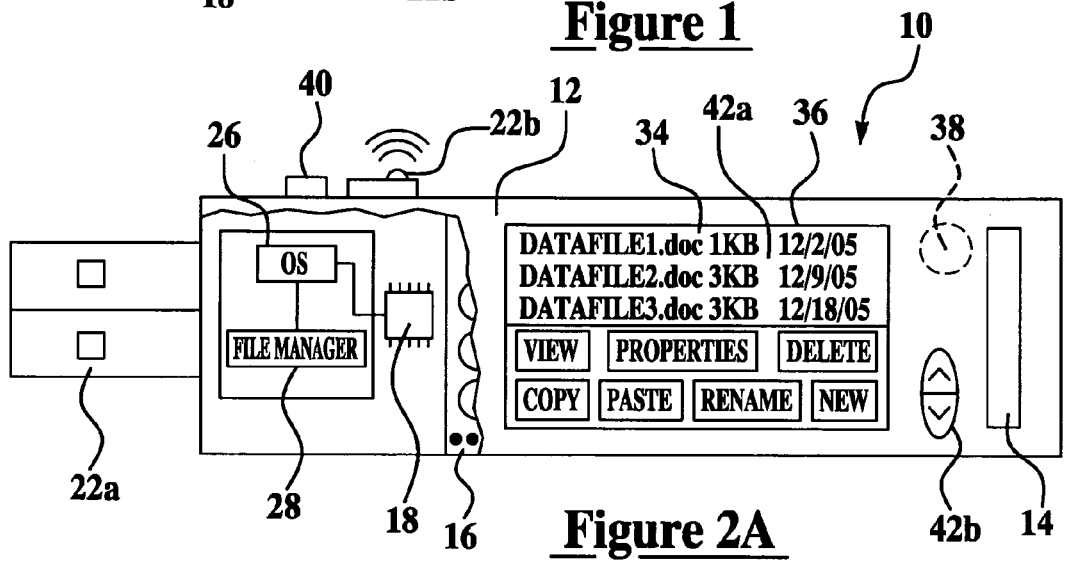
FIG. 2A is a top view of the external memory storage device of FIG. 1 shown with an embedded operating system.

Referring to FIGS. 1 and 2A, one embodiment of an external memory storage device is generally indicated at 10. In the embodiment shown, the external memory storage device 10 is a flash drive as will be explained in greater detail below. However, the external memory storage device 10 could be any device that can be removably connected to a computing device, such as a personal computer, a palm device, and the like, for storing files transferred from the computing device.

The external memory storage device includes a housing 12. In the embodiment shown, the housing 12 is generally elongate and hollow. The housing 12 encapsulates various components of the external memory storage device 10 as described below.

The storage device 10 also includes a writing surface 14, such as a label with an adhesive backing. The writing surface 14 is included on the housing 12. The writing surface 14 provides a surface for writing manually on the memory storage device 10. Thus, the user can write on the writing surface 14 to label the storage device 10 to manually list the contents stored in memory. It should be appreciated that the writing surface 14 could be disposed at any suitable location on the storage device 10.

As shown in FIG. 2A, the storage device 10 also includes a circuit board 16. The circuit board 16 is substantially encapsulated within the housing 12. Various electrical components are electrically and mechanically attached to the circuit board 16 for the operation of the storage device 10.

The memory storage device 10 also includes a solid state memory component, generally indicated at 18. The memory component 18 is electrically and mechanically attached to the circuit board 16 as shown in FIG. 2A. In one embodiment, the memory component 18 includes at least one flash memory chip. The flash memory chip can have any suitable capacity. The memory component 18 allows information to be stored on the external memory storage device 10. Information can be removed or transferred from the memory component 18 relatively quickly as well. Information transfer to and from the memory component 18 occurs noiselessly because the memory component 18 has no moving parts. Furthermore, the memory component 18 is relatively small and light, making the external memory storage device 10 more portable.

The memory storage device 10 also includes a connector 22a. In one embodiment, the connector 22a is a male-type USB connector. The connector 22a is rigidly fixed to the circuit board 16, and the connector 22a extends out from the housing 12. It should be appreciated that the connector 22a could be a female connector, a flexible cord, or any other suitable type without departing from the scope of the invention. In the embodiment shown, the memory storage device 10 includes an additional connector 22b that allows for wireless communication between the memory storage device 10 and the computer 24 or other suitable device. For instance, in one embodiment, the connector 22b receives and transmits infrared signals to thereby allow for wireless communication for added convenience. It should be appreciated that the memory storage device 10 could include only one of the connectors 22a, 22b without departing from the scope of the present disclosure. The memory storage device 10 can communicate with the computer 24 via either connector 22a, 22b, thereby allowing files and file properties, such as file names to be transferred between the memory storage device 10 and the computer 24 as will be discussed in greater detail below.

Figure 2B:
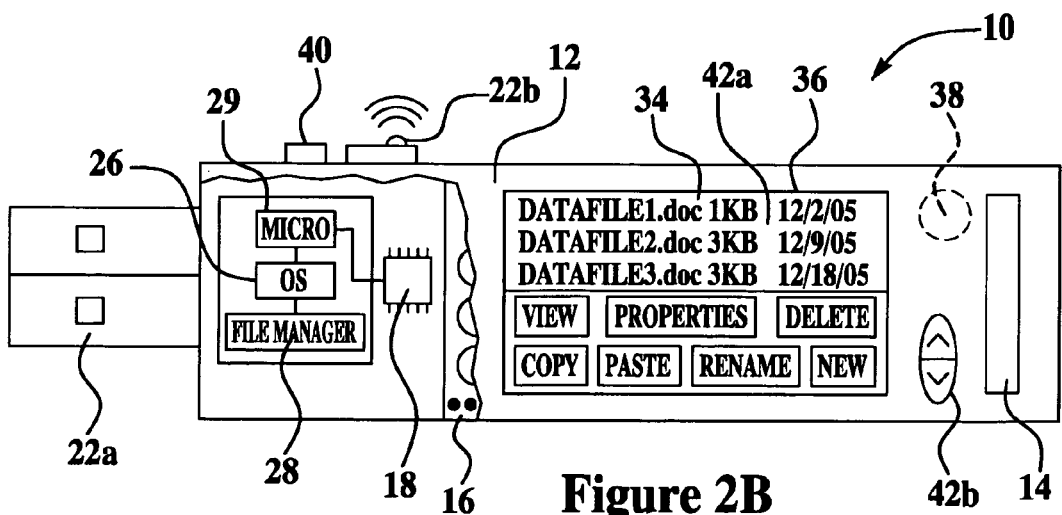
FIG. 2B is a top view of the external memory storage device of FIG. 1 shown with a microprocessor.

As shown in FIG. 2A, the storage device 10 also includes an embedded operating system 26 and a file manager program 28. The embedded operating system 26 and the file manager program 28 operate to allow the user to manage files stored on the memory storage device 10 as will be described below. In another embodiment shown in FIG. 2B, the storage device 10 includes a microprocessor 29 in addition to an operating system 26 and a file manager program 28. In the embodiment of FIG. 2B, the microprocessor 29 operates in combination with the operating system 26 and the file manager program 28 to manage resource allocation for processing any inputs to the storage device 10 and for managing files stored on the memory storage device 10.

The memory storage device 10 also includes a display 34. The display 34 is operable to display file names, file contents, and/or properties of files stored on the memory storage device 10. In the embodiment shown, the housing 12 includes an opening 36 within which the display 34 is disposed. In another embodiment, the display 34 is separate from the housing 12, and file names, file contents, and/or properties of the files stored on the memory storage device 10 are communicated to the display 34 via wires or via wireless communication means. The display 34 can removably attach to the housing 12 of the memory storage device 10 in one embodiment. Furthermore, in one embodiment, the display 34 includes an LCD screen. In another embodiment, the display 34 includes an LED screen.

It should be appreciated that the display 34 could display any suitable information. The display 34 can display the names of files stored on the flash memory chip 20. For example, the display 34 shown in FIG. 2A displays three file names, DATAFILE 1.doc, DATAFILE 2.doc, and DATAFILE 3.doc. File properties are also displayed such as the file size and modification date of each file. File contents can also be viewed on the display 34 once a file name is selected as will be discussed. Information about the owner or user of the memory storage device 10 could also be shown on the display 34, for instance, when the memory storage device 10 is turned on.

The memory storage device 10 also includes a power source 38, such as a battery. The power source 38 supplies power to the display 34 and any other power consuming components of the memory storage device 10. In one embodiment, the power source 38 is automatically recharged when the memory storage device 10 is connected to the computer 24. The memory storage device 10 further includes a switch 40. The switch 40 is operable to turn the display 34 on and off. In one embodiment, the switch turns the display 34 off automatically after the memory storage device 10 remains idle (i.e., no input is provided to the memory storage device 10) for a predetermined amount of time. In one embodiment shown, the switch 40 can be manually moved by the user between an on and off position.

Furthermore, the memory storage device 10 includes at least one input device 42a, 42b. In the embodiment shown, the memory storage device 10 includes a plurality of input devices including a touch sensitive device 42a and a movable device 42b. The touch sensitive device 42a can be touched with a user's finger, a stylus, or other apparatus for providing input for managing files stored on the memory storage device 10 as will be discussed in greater detail below. The movable device 42b, such as a button, joystick, or other apparatus, can be moved to thereby provide input for managing files stored on the memory storage device 10 as will be discussed in greater detail below.

The touch sensitive device 42a can be of any suitable type. For instance, in one embodiment, the touch sensitive device 42a is a resistive touch sensitive panel coated with a thin, metallic, electrically conductive and resistive layer that causes a change in electrical current when the touch sensitive device 42a is touched. In another embodiment, the touch sensitive device 42a is a surface wave-type touch sensitive panel. The surface wave technology uses ultrasonic waves that pass over the touch sensitive panel. When the panel is touched, a portion of the wave is absorbed to provide an input signal to the memory storage device 10. In another embodiment, the touch sensitive device 42a includes a capacitive touch sensitive panel. When the capacitive touch sensitive panel is touched, the capacitance is altered to provide input to the memory storage device 10.

In one embodiment, the touch sensitive device 42a is at least partially disposed over the display 34 and associated therewith such that the display 34 is a touch screen display. As such, information displayed on the display 34 can be selected by touching the display 34 adjacent the information to be selected as will be discussed in greater detail.

As shown in FIG. 1, the memory storage device 10 can be connected to the computer 24 via the connector 22a and a corresponding female connector on the computer 24. The memory storage device 10 could alternatively be in communication with the computer 24 via the wireless connector 22b and a corresponding wireless connector associated with the computer 24. The computer 24 can include various input devices, such as a keyboard 30 and a computer mouse 32 as is widely known in the art. As such, the memory storage device 10 is indirectly connected to the keyboard 30 and the mouse 32 when the memory storage device 10 is in communication with the computer 24. A user can transfer files stored on the computer 24 and store them on the memory storage device 10, and the user can transfer files stored on the memory storage device 10 and store them on the computer 24. The user can also manage files stored on the memory storage device 10 by providing input via the keyboard 30 and/or the mouse 32.

Also, in the embodiment shown in FIG. 1, the memory storage device 10 can be connected directly to the keyboard 30 via the connector 22a and a corresponding female connector on the keyboard 30. The memory storage device 10 could also be in direct communication with the keyboard 30 via the wireless connector 22b and a wireless connector associated with the keyboard 30. Accordingly, the user can provide input to the memory storage device 10 via the keyboard 30.

Furthermore, in the embodiment shown in FIG. 1, the memory storage device 10 can be connected directly to the mouse 32 via the connector 22a and a corresponding female connector associated with the mouse 32. The memory storage device 10 could also be in direct communication with the mouse 32 via the wireless connector 22b and a wireless connector associated with the mouse 32. Accordingly, the user can provide input to the memory storage device 10 via the mouse 32.

Thus, a user can provide input to the memory storage device 10 by using the keyboard 30, the mouse 32 or any other peripheral input device. These inputs can be used to manage the files stored on the memory storage device 10. For instance, the user can use the keyboard or mouse 30, 32 to display on the screen of the computer all file names corresponding to the files stored on the memory storage device 10. Once displayed, the user can select one of the files with the mouse or keyboard 30, 32 and view the contents of the file. The user can also view the properties of one of the files, delete one of the files, copy one of the files, paste one of the files, rename one of the files, and/or create a new file using the keyboard and/or mouse 30, 32.

When the memory storage device 10 is disconnected from the computer 24, the display 34 and the touch sensitive device 42a provides a means for providing input for managing the files stored on the memory storage device 10. The operating system 26 and the file manager program 28 (FIG. 2A) or the operating system 26, the file manager program 28, and the microprocessor 29 (FIG. 2B) provide various functions for managing the files stored on the storage device 10. For instance, in the embodiment shown in FIGS. 2A and 2B, the display 34 displays text describing certain functions including VIEW, PROPERTIES, DELETE, COPY, PASTE, RENAME, and NEW. When a user wishes to view the contents of one of the files, the user taps the display 34 on the desired file name to select the file and then taps the zone labeled VIEW. When a user wishes to view the properties of a particular file, the user taps the display 34 on the desired file name to select the file and then taps the zone labeled PROPERTIES. When a user wishes to delete a file, the user taps the display 34 on the desired file name and then taps the zone labeled DELETE. When a user wishes to copy a file, the user taps the display 34 on the desired file name and then taps the zone labeled COPY. When a user wishes to paste a file, the user taps the display 34 on the desired file name and then taps the zone labeled PASTE. When a user wishes to rename a file, the user taps the display 34 on the desired file name and then taps the zone labeled RENAME. When a user wishes to create a new file, the user taps the zone labeled NEW. As such, the user is able to quickly and conveniently manage the files stored on the memory storage device 10 even when the memory storage device 10 is disconnected from the computer 24, keyboard 30, mouse 32, and other external input device. The display 34 could also show a scroll bar or other similar device, and when the user touches the display 34 near the scroll bar, the list shown on the display 34 begins to scroll. It should be appreciated that other functions could be included and displayed on the display 34. It should also be appreciated that the display 34 could include pull down menus and/or pop-up menus that are displayed independently or in association with screen taps to manage the contents stored in memory.

The user can also provide input with the movable input device 42b. More specifically, if a user wishes to view the contents of one of the files, the user presses the movable input device 42b until the desired file is highlighted on the display 34. Then, for example, the user presses the movable input device 42b twice in rapid succession (i.e., double clicks) to view the file contents. The movable input device 42b could also cause the display 34 to scroll in one embodiment. Furthermore, the memory storage device 10 could include a plurality of movable input devices 42b, in which one of the movable input devices 42b is used for scrolling through file names, one of the movable input devices 42b is used for scrolling through the functions VIEW, PROPERTIES, DELETE, COPY, PASTE, RENAME, and NEW, and one of the movable input devices 42b is used for selecting either a file name or a function. It should be appreciated that the memory storage device 10 could include just one of the touch sensitive device 42a and the movable device 42b without departing from the scope of the disclosure.

Figure 3:
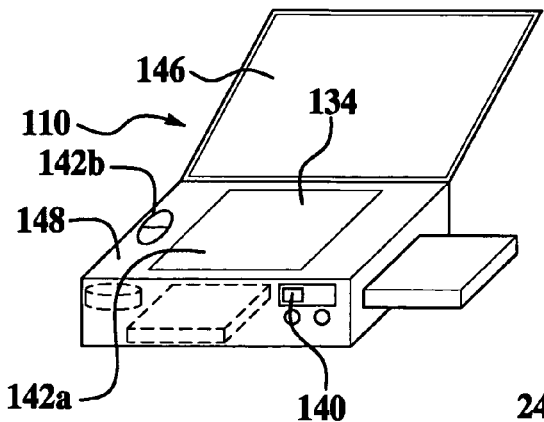
FIG. 3 is a schematic view of another embodiment of the external memory storage device.

Turning now to FIGS. 3A and 3B, another embodiment of the external memory storage device is indicated at 110, where like components are indicated with like reference numerals increased by 100 with respect to the embodiment shown in FIGS. 1, 2A and 2B. In the embodiment shown, the memory storage device 110 includes a cover 146 that can be attached to the main body portion 148 of the memory storage device 110. In one embodiment shown in FIG. 3A, the cover 146 is hingeably and pivotally attached to the main body portion 148. In another embodiment, the cover 146 is slidably attached to the main body portion 148. The cover 146 can also be removably attached to the main body portion 148. The cover 146 can also be removably attached and tethered to the main body portion 148 by a strap. The cover 146 is movable with respect to the main body portion 148 between a closed position and an open position. In the closed position, the cover 146 substantially covers the display 134. In the open position, the cover 146 is moved away from the main body portion 148 to substantially expose the display 134. In one embodiment, the switch 140 automatically turns the display 134 on when the cover 146 moves from the closed position toward the open position. Also, the switch 140 automatically turns the display 134 off as the cover 146 moves away from the open position and toward the closed position. The cover 146 provides protection to the display 134 when in the closed position. Also, the cover 146 can provide a convenient means for turning the display 134 on and off.

Figure 4:
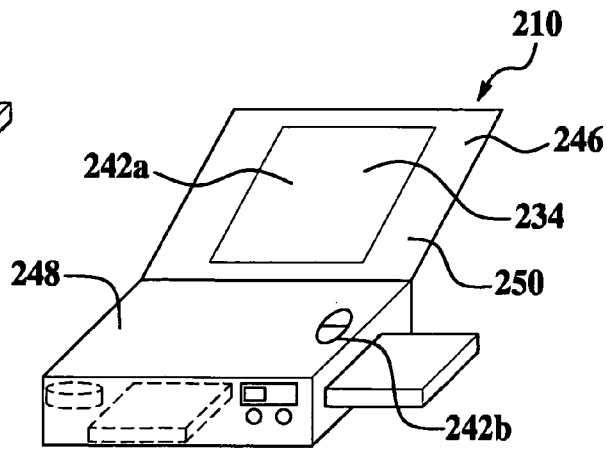
FIG. 4 is a schematic view of another embodiment of the external memory storage device.
Figure 5:
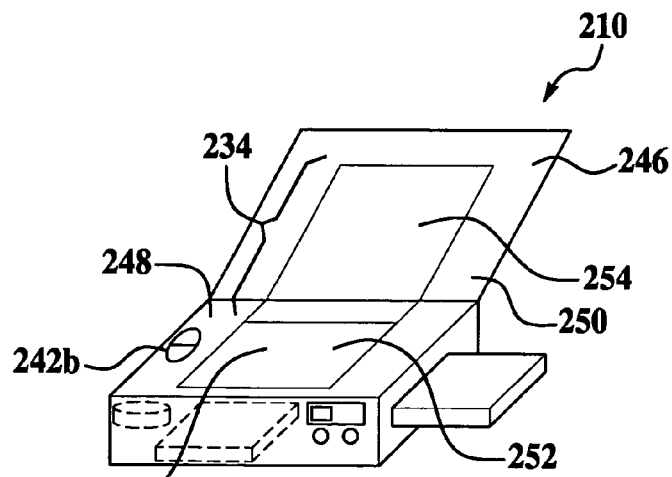
FIG. 5 is a schematic view of another embodiment of the external memory storage device.

Turning now to FIGS. 4 and 5, another embodiment of the external memory storage device is indicated at 210, where like components are indicated by like reference numerals increased by 200 with respect to the embodiment shown in FIGS. 1, 2A and 2B. In the embodiment shown, the memory storage device 210 includes a cover 246 that is hingeably and pivotally attached to the main body portion 248. The cover 246 includes an inner surface 250 that is disposed adjacent the main body portion 248 when the cover 246 is in the closed position. In the embodiment shown, the display 234 is disposed on the inner surface 250 of the cover 246.

In FIG. 5, the display 234 is disposed on both the inner surface 250 of the cover 246 and the main body portion 248. As such, the display 234 can be larger to facilitate viewing of the contents stored in memory, yet the memory storage device 210 can still be relatively compact for more portability.

Also, in the embodiment shown in FIG. 5, the touch sensitive device 242a and the display 234 are disposed in spaced relationship so as to define a touch sensitive area 252 and a display area 254. A user can provide input to the memory storage device 210 via the touch sensitive area 252 in the manner described above. The display area 254 is not touch sensitive, but contents stored in memory are displayed on the display area 254. It will be appreciated that the display area 254 and the touch sensitive area 252 can be disposed in any suitable location on the memory storage device 210.

Figure 6:
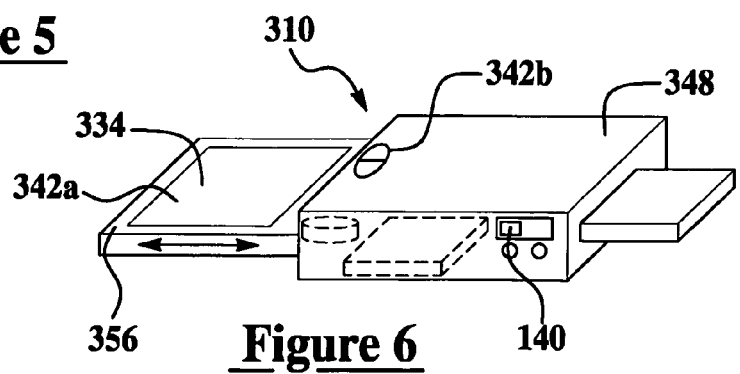
FIG. 6 is a schematic view of another embodiment of the external memory storage device.

Turning now to FIG. 6, another embodiment of the external memory storage device is generally indicated at 310, where like components are indicated by like reference numerals increased by 300 with respect to the embodiment shown in FIGS. 1, 2A and 2B. The memory storage device 310 includes a sliding member 356 that is slidingly coupled to the main body portion 348. The display 334 is disposed on the sliding member 356. As such, the sliding member 356 can slide toward the main body portion 348, and in one embodiment, be encapsulated within the main body portion 348, such that the memory storage device 310 is more compact. The sliding member 356 can also slide away from the main body portion 348 to reveal and use the display 334.

In summary, the memory storage device 10, 110, 210, 310 allows a user to quickly and conveniently transfer files to and from a computing device 24. The memory storage device 10, 110, 210, 310 can also be relatively small for portability. Also, the memory storage device 10, 110, 210, 310 allows a user to identify the contents stored on the memory storage device 10, 110, 210, 310 using the display 34, 134, 234, 334. Furthermore, the memory storage device 10, 110, 210, 310 allows the user to provide input and manage the stored contents using either the touch sensitive input device 42a, 142a, 242a, 342a or the movable input device 42b, 142b, 242b, 342b even when the memory storage device 10 is disconnected from the computing device 24, keyboard 30, mouse 32, and other peripheral input device.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flash drive that can be removably connected to a computing device for storing files transferred from the computing device, the flash drive comprising:
    at least one flash memory chip operable to store files transferred from the computing device;
    a display operable to display information related to files stored on the at least one flash memory chip; and
    an input device operable for providing input for managing files stored on the flash drive.

2. The flash drive of claim 1, wherein the input device comprises a touch sensitive device operable for providing input for managing files stored on the at least one flash memory chip.

3. The flash drive of claim 2, wherein the touch sensitive device is disposed at least partially over the display such that the information can be selected by touching the display adjacent the information.

4. The flash drive of claim 1, wherein the input device comprises a movable device which can be moved to thereby provide input for managing files stored on the at least one flash memory chip.

5. An external memory storage device that can be removably connected to a computing device for storing files transferred from the computing device, the memory storage device comprising:
    a connector that allows files to be transferred between the computing device and the memory storage device;
    a solid-state memory component operable to store files transferred to the memory component from the computing device;
    a display operable to display file names stored on the memory component and operable for providing input for managing files stored on the memory component; and
    a touch sensitive device for providing input for managing files stored on the memory component.

6. The memory storage device of claim 5, wherein the memory component includes at least one flash memory chip.

7. The memory storage device of claim 5, wherein the connector is chosen from a group consisting of a USB connector and an infrared wireless connector.

8. The memory storage device of claim 5, further comprising a circuit board, and wherein the connector is rigidly fixed to the circuit board.

9. The memory storage device of claim 5, wherein the display includes an LCD screen.

10. The memory storage device of claim 5, further comprising a switch operable to turn the touch screen display on and off.

11. The memory storage device of claim 10, wherein the switch is operable to turn the display off automatically after the memory storage device remains idle for a predetermined amount of time.

12. The memory storage device of claim 5, further comprising a main body portion and a cover that is movable with respect to the main body portion between a closed position and an open position, wherein the cover substantially covers the display when in the closed position, and wherein the display is substantially exposed when in the open position.

13. The memory storage device of claim 12, wherein the display is disposed entirely on the cover.

14. The memory storage device of claim 12, wherein the display is disposed on both the cover and the main body portion.

15. The memory storage device of claim 5, wherein the touch sensitive device and the display are disposed in spaced relationship so as to define a touch sensitive area, which is operable for providing input for managing files stored on the memory component, and a display area, which is operable to display file names stored on the memory component.

16. The memory storage device of claim 5, further comprising an operating system that allows a user to manage files stored on the memory component, the operating system providing at least one function chosen from a group consisting of a view file function, a view file properties function, a delete file function, a copy file function, a paste file function, a rename file function, and a create new file function.

17. The memory storage device of claim 5, further comprising a power source for supplying power to the display, wherein the power source is automatically recharged when the memory storage device is connected to the computing device.

18. The memory storage device of claim 5, further comprising a sliding member and a main body portion, wherein the sliding member is slidingly coupled to the main body portion, and wherein the display is disposed on the sliding member.

19. A flash drive that can be connected to a computing device for storing files transferred from the computing device, the flash drive comprising:
- a housing;
- a circuit board encapsulated within the housing;
- a connector operable to allow files to be transferred between the computing device and the flash drive;
- at least one flash memory chip operable to store files and file names transferred from the computing device;
- an LCD touch screen display operable to display file names on the flash memory chip and operable for providing input for managing the files stored on the flash memory chip; and
- an operating system that allows a user to manage files stored on the at least one flash memory chip, the operating system providing at least one function chosen from a group consisting of a view file function, a view file properties function, a delete file function, a copy file function, a paste file function, a rename file function, a create new file function, and a combination thereof.

20. The flash drive of claim 19, further comprising a main body portion and a cover that is movable with respect to the main body portion between a closed position and an open position, wherein the cover substantially covers the touch screen display when in the closed position, wherein the touch screen display is substantially exposed when in the open position, and wherein the touch screen display is disposed on the main body portion and the cover.

21. A flash drive that can be removably connected to a computing device for storing files transferred from the computing device, the flash drive comprising:
- a main body portion;
- at least one flash memory chip operable to store files transferred from the computing device;
- a touch screen display operable to display information related to files stored on the at least one flash memory chip and operable for providing input for managing the files stored on the flash memory chip; and
- a cover that is movable with respect to the main body portion between a closed position and an open position, wherein the cover substantially covers the touch screen display when in the closed position, wherein the touch screen display is substantially exposed when the cover is in the open position, and wherein the touch screen display is disposed on the main body portion and the cover.

* * * * *